(12) United States Patent
Chalouhi et al.

(10) Patent No.: US 9,253,143 B2
(45) Date of Patent: Feb. 2, 2016

(54) REVERSE SUBSCRIPTIONS

(75) Inventors: Olivier Chalouhi, Redwood City, CA (US); Paul Anton Richardson Gardner, Palo Alto, CA (US)

(73) Assignee: Azureus Software, Inc., Incline Village, NV (US)

(*) Notice: Subject to any disclaimer, the term of this patent is extended or adjusted under 35 U.S.C. 154(b) by 600 days.

(21) Appl. No.: 12/562,048

(22) Filed: Sep. 17, 2009

(65) Prior Publication Data

US 2010/0094937 A1 Apr. 15, 2010

Related U.S. Application Data (60) Provisional application No. 61/097,711, filed on Sep. 17, 2008.

(51) Int. Cl.
*G06F 15/16* (2006.01)
*H04L 29/12* (2006.01)
*G06F 17/30* (2006.01)
*H04L 29/08* (2006.01)

(52) U.S. Cl.
CPC ...... *H04L 61/1582* (2013.01); *G06F 17/30097* (2013.01); *H04L 67/1065* (2013.01)

(58) Field of Classification Search
CPC .............. G06F 17/30097; H04L 61/1582; H04L 67/1065
USPC ......................................... 709/204
See application file for complete search history.

(56) References Cited

U.S. PATENT DOCUMENTS

| 7,533,184 | B2 | 5/2009 | Miller et al. | |
|---|---|---|---|---|
| 2004/0249972 | A1* | 12/2004 | White et al. | 709/243 |
| 2006/0149806 | A1* | 7/2006 | Scott et al. | 709/201 |
| 2008/0066182 | A1 | 3/2008 | Hickmott et al. | |
| 2009/0276522 | A1* | 11/2009 | Seidel | 709/224 |
| 2009/0300673 | A1* | 12/2009 | Bachet et al. | 725/31 |

FOREIGN PATENT DOCUMENTS

| HK | 1159883 A | 8/2012 |
|---|---|---|
| WO | WO-2007297417 A1 | 12/2007 |
| WO | WO-2008066182 A1 | 3/2008 |
| WO | WO-2010033732 A1 | 3/2010 |

OTHER PUBLICATIONS

"International Application Serial No. PCT/US2009/057362, International Preliminary Report on Patentability Apr. 11, 2011", 4 pgs.

(Continued)

*Primary Examiner* — David Lazaro
*Assistant Examiner* — Xiang Yu
(74) *Attorney, Agent, or Firm* — Schwegman Lundberg & Woessner, P.A.

(57) ABSTRACT

A method and system for retrieving subscription information associated with a content file are provided. The method, according to an example embodiment, includes automatically generating a hash of the content file and retrieving an identifier for the subscription from a peer machine participating in a distributed hash table network. Subscription information is then retrieved using the subscription identifier, either from a specially configured subscription server or from a subscriber machine in the distributed hash table network.

20 Claims, 6 Drawing Sheets

(56) References Cited

OTHER PUBLICATIONS

"International Application Serial No. PCT/US2009/057362, Search Report mailed Nov. 2, 2009".

"International Application Serial No. PCT/US2009/057362, Written Opinion mailed Nov. 2, 2009".

"European Application Serial No. 09815217.6, Response filed Jan. 4, 2013 to Office Action mailed Feb. 23, 2012", 14 pgs.

"European Application Serial No. 09815217.6, Extended Search Report mailed Feb. 23, 2012", 5 pgs.

"European Application Serial No. 09815217.6, Office Action mailed May 17, 2011", 2 pgs.

"European Application Serial No. 09815217.6, Response filed Nov. 16, 2011 to Office Action mailed May 17, 2011", 9 pgs.

\* cited by examiner

REVERSE SUBSCRIPTIONS

RELATED APPLICATIONS

This application claims the benefit of priority, under 35 U.S.C. §119(e), to U.S. Provisional Patent Application Ser. No. 61/097,711, filed on Sep. 17, 2008, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Vuze, Inc. All Rights Reserved.

TECHNICAL FIELD

Example embodiments relate to networked distribution of multimedia content.

BACKGROUND

Subscriptions allow users to specify a feed and filters to record or download desired multimedia content, but the content itself cannot be traced back to a normal subscription. For example, a TiVo® customer can create a Season Pass™ subscription to record all episodes of their favorite television program as they air. A web browser can be configured to download web page updates using RSS (rich site summary). A user of the VUZE® client (developed by Vuze, Inc. of Palo Alto, Calif.) may create a subscription to download content such as all television programs within a genre, that are shown on a particular channel, or that are found as a result of a search query.

BitTorrent is currently one of the most popular methods of distributing large files over the Internet. For a given file, the BitTorrent protocol embodies four main roles: an initial seeder, new seeders, a tracker, and peers. Initial seeders, new seeders, and peers are all transient clients; trackers are typically web servers. The initial seeder is the source of the file, and operates by dividing a file into small pieces, creating a metadata description of the file and sending this description to the tracker. Peers discover this file metadata description, usually as a .torrent file, through some out-of-band mechanism (e.g., a web page) and then begin looking for pieces of the file. Peers contact a central tracker to bootstrap their knowledge of other peers and seeds, and the tracker returns a randomized subset of other peers and seeds. Initially, only the initial seeder has pieces of a file, but soon peers are able to exchange missing pieces with each other. Once a peer acquires all of the pieces of a file, it becomes a new seeder. This collection of clients actively sharing a file is called a swarm.

In some client-based peer-to-peer (P2P) systems (e.g., VUZE®), file descriptors and other metadata are stored in a distributed hash table (DHT), in which all clients participate, and any node can be assigned the role of tracker if its unique identification number is equal or close to the hash of a given file's descriptor. This is mainly used as a backup mechanism when the original tracker is offline or otherwise not responding to requests for the file. However, the DHT is also a way to distribute a file without a central tracker at all or to locate additional peers that are not connected to a tracker.

SUMMARY

A method and system for associating a multimedia content file with subscriptions including the content file are provided. A system, according to an example embodiment, includes modules to create and store subscriptions and to communicate with a subscription server and distributed hash table (DHT) network in order to associate content with subscriptions and perform lookups on content to retrieve subscriptions. The system also includes modules to save settings and create hashes of content filenames and subscription identification numbers, the hashes being used as keys in the DHT to retrieve stored values.

BRIEF DESCRIPTION OF THE DRAWINGS

Embodiments of the present subject matter are illustrated by way of example and not limitation in the figures of the accompanying drawings, in which like reference numbers indicate similar elements.

DETAILED DESCRIPTION

A method and system, according to an example embodiment, use a subscription server and a distributed hash table in order to link pieces of content back to subscriptions that contain the content, which is referred to as a "reverse subscription." The ability to link backwards to a subscription allows users to subscribe to feeds without having to craft filters themselves, and it allows users to discover other content they might have otherwise not known about. In the following description, for purposes of explanation, numerous specific details are set forth in order to provide a thorough understanding of the present invention. It will be evident, however, to one skilled in the art that the present invention may be practiced without these specific details.

In an example embodiment, retrieving subscription information associated with a given content file comprises automatically generating a hash, which is an integer representation of a piece of data, of the content file at a client computer. The hash is used as a key into a distributed hash table (DHT) to retrieve at least one subscription identifier from a peer machine in the DHT network, and the subscription information is retrieved using the subscription identifier.

In one example embodiment, the subscription information is retrieved from a master subscription server using the subscription identifier. In another embodiment, the subscription identifier, or a hash of the subscription identifier, is used as a key into the DHT to retrieve connection information for a peer machine storing the subscription information, also known as a subscriber. The client program then requests the subscription information from the subscriber. This may be done via a connection (such as TCP) or connectionless protocol (such as UDP). If the subscriber does not respond to the request, the client program attempts to retrieve the connection information from another subscriber. Using the DHT to retrieve and store this information has the advantage of providing a decentralized, scalable, fault-tolerant database solution.

In another example embodiment, connection information for the client machine is stored in the DHT using the subscription identifier, or a hash of the subscription identifier, as a key.

After retrieving the subscription information, the client program may automatically download other content files identified as part of the subscription. These downloads may also be limited to a transfer rate defined in the client program and may use the BitTorrent protocol to retrieve the other content files from other peer machines that store the content files. Furthermore, the subscription information may include a user-submitted ranking, to which the user of the client program may contribute.

Figure 1:
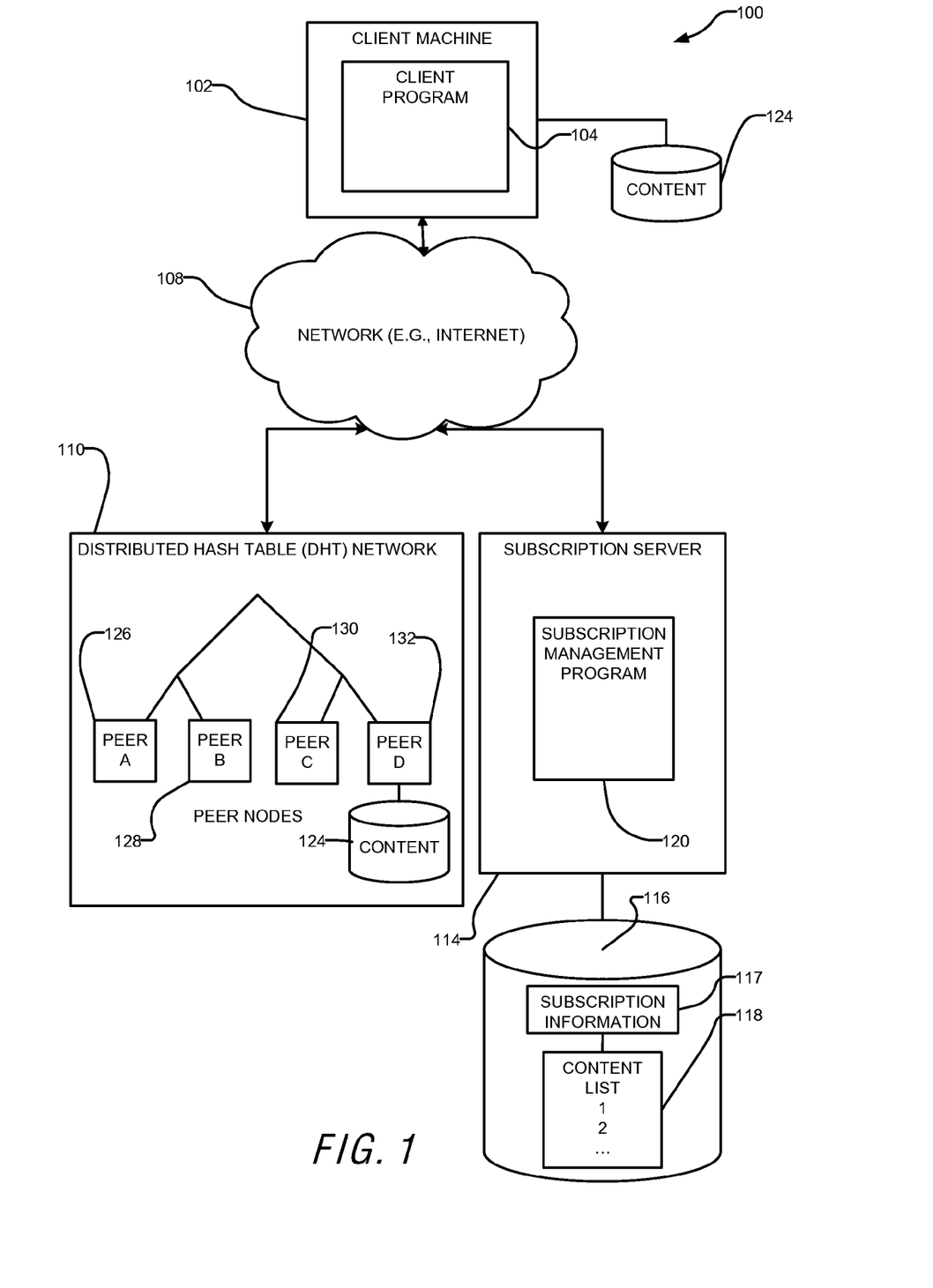
FIG. 1 is a network diagram illustrating a client machine participating in creating or retrieving a subscription, according to an example embodiment.

An example embodiment of the claimed subject matter is shown in FIG. 1, which is a block diagram illustrating a networking environment 100 within which a client program 104 running on a client machine 102 is connected to a subscription server 114 and a distributed hash table (DHT) 110 over a network 108 (e.g., the Internet). The client machine 102 may be any network-enabled device such as a computer, personal digital assistant, cell phone, or routing device. The client program 104 (shown in more detail in FIG. 2) manages connections with the DHT 110, the subscription server 114, and any peer machines. The DHT 110 (shown in more detail in FIG. 4) is a scalable, decentralized database system that provides a lookup service similar to a hash table. Instead of storing data on one machine or machines located in the same facility as with a traditional database, the DHT 110 stores data on all computers connected to it, known as peer nodes. Each peer node maintains a set of links to other peer nodes (its neighbors or routing table), and these links form an overlay network, also referred to herein as the DHT network. Various algorithms may be employed to store and receive data from the DHT network, the details of which are generally known by skilled artisans and are unimportant to the understanding of the claimed subject matter.

The subscription server 114 contains a subscription management program 120 which uses a database 116 to store subscription information 117 and a content list 118 of all content files associated with that subscription. DHT peer nodes 126, 128, 130, 132 participate in the DHT along with the client machine 102 and store subscription information 117 and content files on a content storage device 124.

Figure 2:
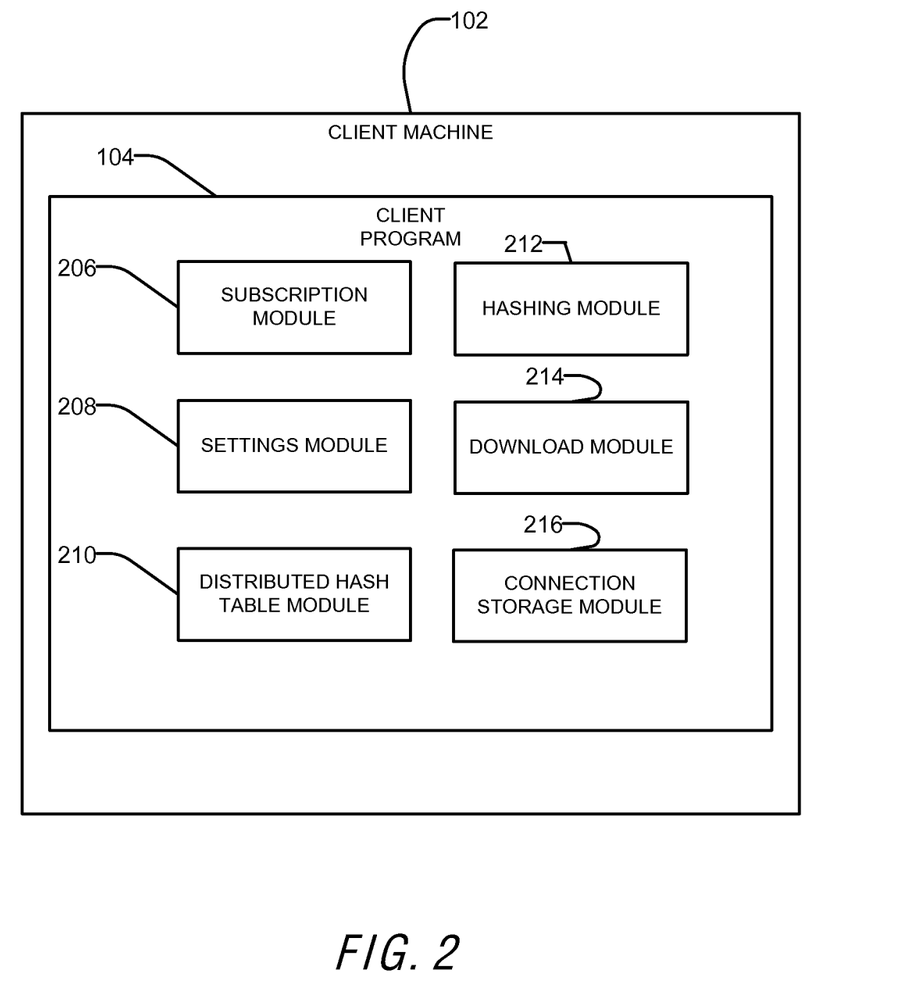
FIG. 2 is a block diagram of modules, according to an example embodiment, contained in a client program running on a client machine to manage content and subscriptions.

FIG. 2 is a block diagram of modules, according to an example embodiment, contained in a client program 104 running on a client machine 102. The client program 104 contains modules to perform the operations of an example embodiment, including a subscription module 206 to store subscription information 117 and content lists 118 and to create and retrieve subscription information 117, a settings module 208 to store preferences such as download limits and automation, a distributed hash table module 210 for connecting to and communicating with the DHT 110, and a hashing module 212 for creating hashes of content and subscriptions for use in the DHT 110. The client program 104 also contains a download module 214 to manage downloading content files, which may be done using the BitTorrent protocol.

Figure 3:
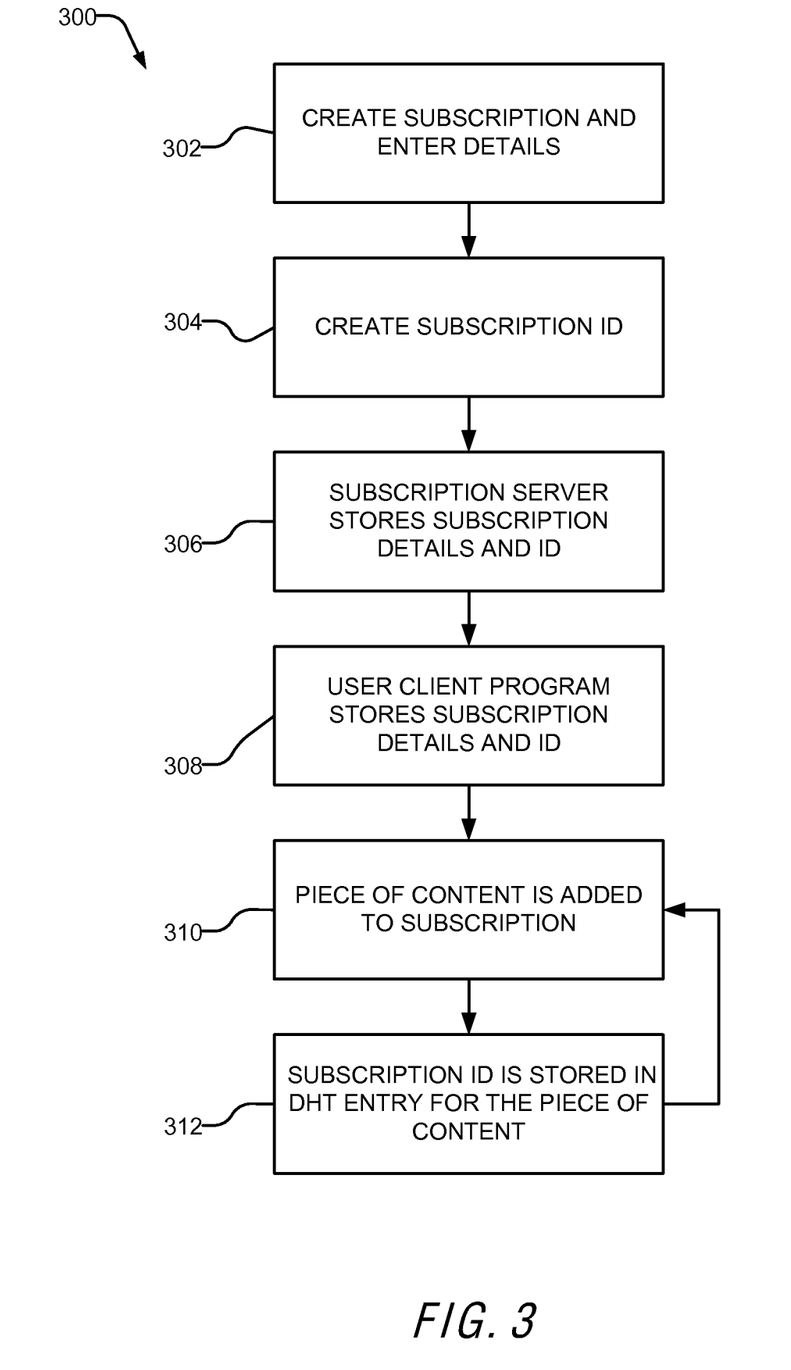
FIG. 3 is a flowchart of operations, according to an example embodiment, that are performed to create a new subscription.

FIG. 3 illustrates a flowchart of the operations of a method 300, used in an example embodiment, to create a subscription and add content 124 that can be linked back to the subscription. At operation 302, a subscription is created along with the subscription information 117, such as a subscription name, description, genre of content, etc. This creation process may be initiated by a client program 104 or may be performed automatically by the subscription server 114. For example, when a new television series debuts, the subscription server 114 may create a subscription that adds each episode to the content list 118 when it airs. Also, a user may save a search for content as a subscription and provide the subscription information 117 directly. At operation 304, the subscription creator (either the subscription server 114 or the client program 104) assigns a subscription ID number to the new subscription. In an example embodiment, the subscription ID is a random number large enough to make the likelihood of duplication vanishingly small.

At operation 306, if the subscription server 114 is available, the subscription server 114 stores the subscription information 117 and the unique ID number in the database 116. If the subscription was created by a client program 104, the client program 104 also stores the subscription details using the subscription module 206 (operation 308).

When a content file is added to the subscription content list 118 (operation 310), a hash, being an integer representation of data, of the subscription ID number is stored in the DHT entry corresponding with the content file that was added to the subscription (operation 312).

Figure 4:
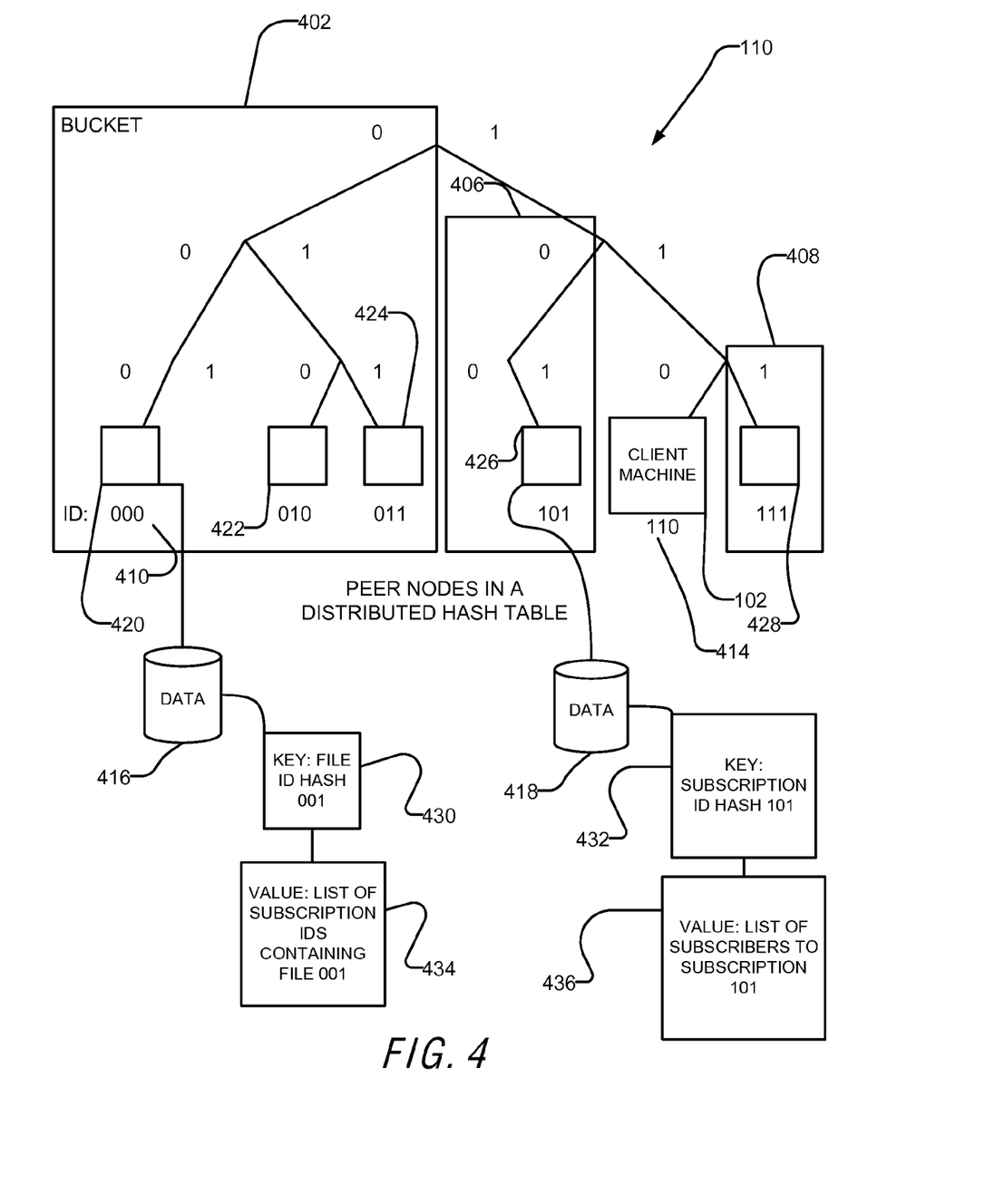
FIG. 4 is a block diagram of a distributed hash table (DHT) tree showing node identifiers (ID's) and distance buckets, according to an example embodiment.

FIG. 4 is a network partition of a DHT 110 containing peer nodes 420, 422, 424, 426, 428, and the client machine 102. In this simplified example, the nodes are indexed in the DHT with a three-bit ID 410, 414 (typical implementations use 160 bits).

In a DHT network, the task of indexing the table of available data is distributed among all clients. A hash is computed for each piece of data and is of the same size as the node ID's. If a client program 104 needs to retrieve data from the DHT 110, the client uses the hash of the data acquired elsewhere as a key 430, 432 to find the ID of a node that is most similar to the data hash. The similarity is determined by a distance algorithm that computes the exclusive-or (XOR) of the data hash and the node ID; smaller values are closer matches. In FIG. 4, the subscriber list 436 for subscription 432 with the hash of '101' is stored in the node 426 with the ID '101' because the subscription ID hash and node ID match; the list of subscriptions 434 for file 430 with the hash of '001' is stored in the node 420 with the ID '000' because node ID '001' does not exist and '000' is the closest match. In example implementations, DHT keys and values are stored in the closest twenty nodes to the hash to provide for redundancy in a network that regularly loses and gains nodes and also to defend against malicious nodes that attempt to disrupt the network. DHT client programs 104 also retrieve data from the closest twenty nodes.

Consider an example scenario in which a client program 104 adds a content file to a subscription. The hashing module 212 computes a hash by converting the content's filename into an integer with a hashing algorithm. In this example, assume the result is the integer 001. The client program 104 stores the subscription ID as a value in the DHT 110 using the filename hash, 001, as the key. As a result, the DHT node 420 with the ID 000 stores the subscription ID in its database 416 for later retrieval.

Figure 5:
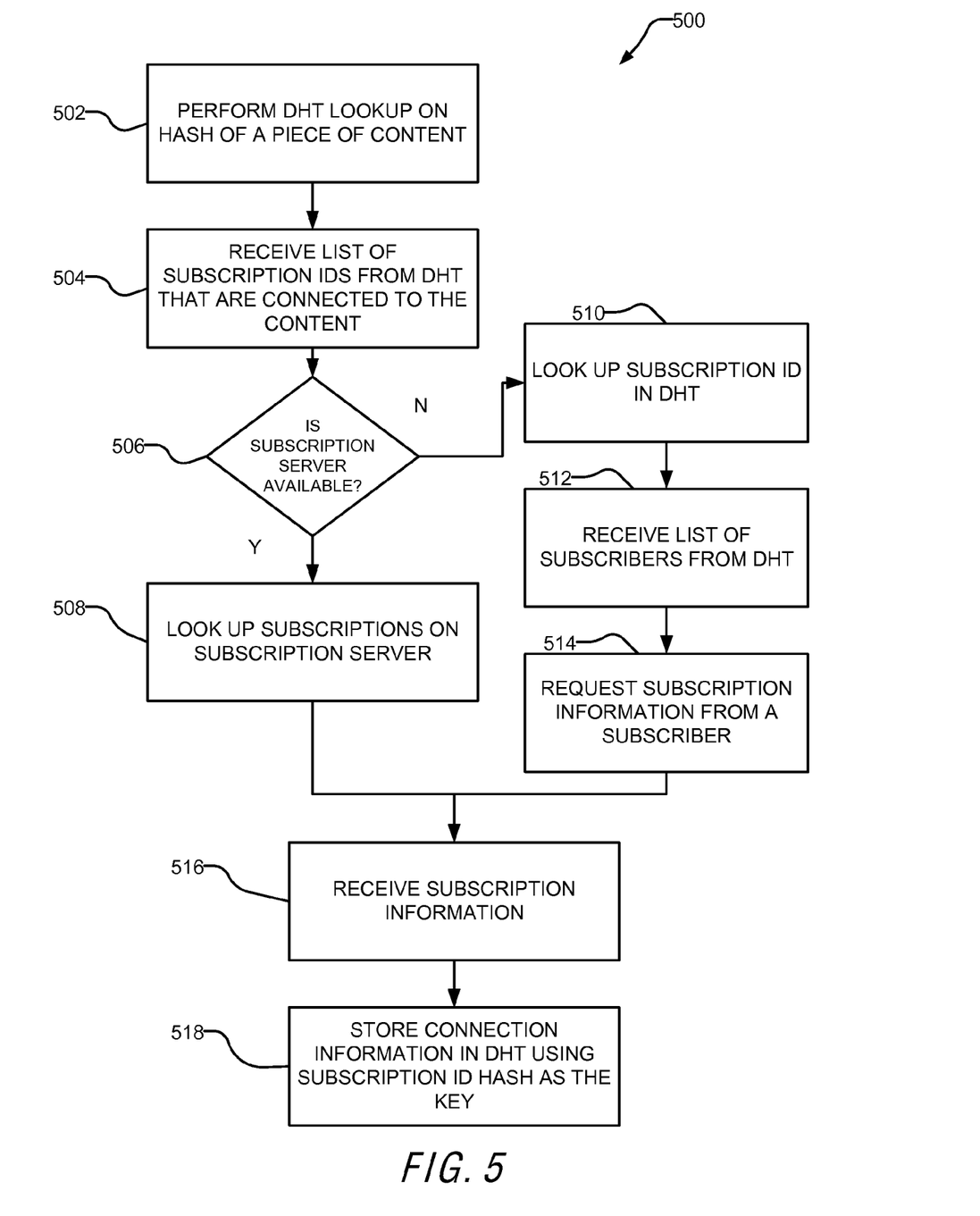
FIG. 5 is a flowchart of operations, according to an example embodiment, that are performed to retrieve an existing subscription given a content file.
Figure 6:
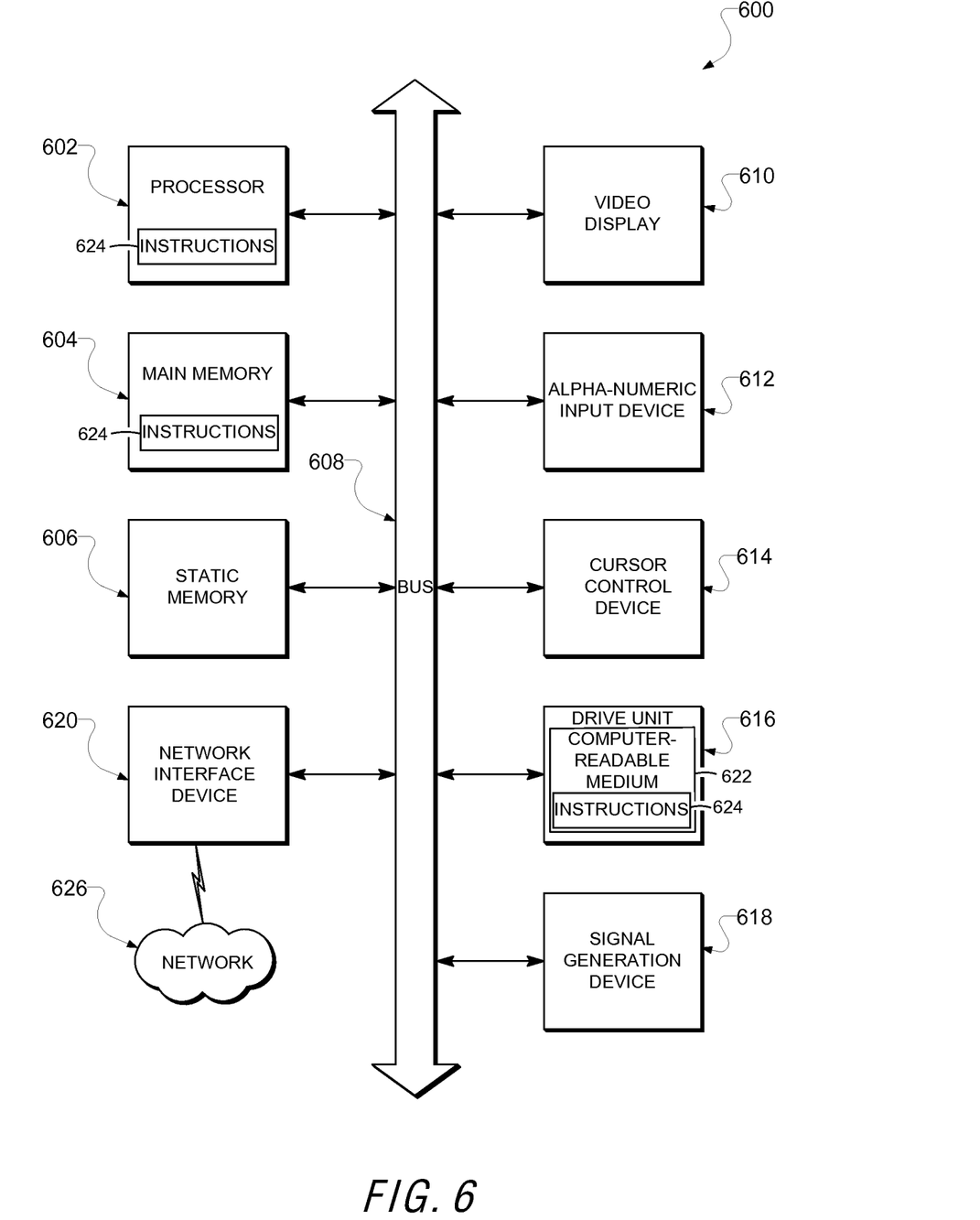
FIG. 6 shows a diagrammatic representation of a machine in the exemplary form of a computer system.

FIG. 5 illustrates a flowchart of the operations of a method 500, used in an example embodiment, to retrieve subscriptions that include a specific content file. At operation 502, a DHT lookup using the hash of a content file to retrieve a stored list of subscription ID's 434 is performed (operation 504). The DHT lookup operation is performed similarly to the store operation described above. This lookup may be initiated by the client program 104, or may be done automatically by the subscription server 114 and presented to the client program 104. When performed automatically by the subscription server 114, the server may flag the content 124 as having associated subscriptions for the client program 104 to view.

In one example embodiment, if the subscription server 114 is available, the subscription information 117 for each found subscription is retrieved from the subscription server database 116 using the subscription ID (operation 508). The client program 104 may have a built-in method of retrieving subscriptions, or it may link to a website hosted in connection with the subscription server 114.

If the subscription server is not available, the DHT 110 is used as a backup mechanism. At operation 510, a hash of the subscription ID is used as a key in the DHT to retrieve connection information (Internet Protocol addresses and ports) from the subscriber list 436. Subscribers are peers that have a stored copy of the subscription information 117 (operation 512). At operation 514, the client program 104 attempts to contact peer machines on the list to retrieve the subscription information 117.

Alternatively, the DHT 110 may be used as the primary method of retrieving subscription information 117, and the subscription server 114 may act as a backup mechanism.

At operation 516, the subscription information 117 is received by the client program 104. The subscription information 117 may be saved on the client machine 102 and displayed to the user so that the user may choose to discover more information about content listed with the subscription. In one example embodiment, the client program 104 automatically downloads files on the content list 118. Alternatively, the user may choose which files to manually download. These downloads may be performed using the BitTorrent protocol or some other method.

At operation 518, the client program 104 stores its connection information in the DHT 110 for use as a backup source of the subscription information 117 and content list 118. The client machine 102 then acts as a subscriber so that future users may retrieve the subscription information 117 and content list 118 from the client machine 102.

The client program 104 may then choose to subscribe and input settings for the settings module 208 such as whether to automatically download new content added to the subscription or a byte limit to not exceed when downloading.

Modules, Components and Logic

Certain embodiments are described herein as including logic or a number of components, modules, or mechanisms. A component is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

FIG. 7 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 624 may further be transmitted or received over a communications network 626 using a transmission medium. The software 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method to retrieve subscription information associated with a first content file, the method comprising:
   automatically generating, at a client computer, by one or more processors, a hash of the first content file located at the client computer;
   using the hash at the client computer as a key into a distributed hash table to retrieve at least one subscription identifier, the subscription identifier uniquely identifying a subscription that has been linked to another copy of the first content file located at a peer computer;
   wherein the subscription contains both a feed describing a source, other than the client computer, of a plurality of different content files, and at least one filter defined by a user of the peer computer, the filter describing a set of criteria used to narrow down the plurality of different content files to a list of content files;
   retrieving a content list corresponding to the list of content files; and
   displaying the content list at the client computer.

2. The method of claim 1, further comprising:
   retrieving subscriber connection information associated with a subscriber from the distributed hash table network using the subscription identifier; and
   requesting the subscription information from the subscriber using the subscriber connection information.

3. The method of claim 1, further comprising:
storing client connection information in the distributed hash table network using a subscription identification hash of the subscription identifier as a key.

4. The method of claim 1, further comprising:
automatically downloading a second content file associated with the subscription identifier.

5. The method of claim 4, wherein downloading is limited to a predefined transfer rate.

6. The method of claim 4, wherein downloading uses the BitTorrent protocol to receive the second content file from at least one peer machine.

7. The method of claim 1, wherein the subscription information includes a user-submitted ranking.

8. A system to retrieve subscription information associated with a first content file, the system comprising:
one or more processors;
a hashing module, implemented by the one or more processors, to automatically generate a hash of the first content file at a client computer;
a distributed hash table module, implemented by the one or more processors, to using the hash at the client computer as a key into a distributed hash table to retrieve at least one subscription identifier, the subscription identifier uniquely identifying a subscription that has been linked to another copy of the first content file located at a peer computer;
wherein the subscription contains both a feed describing a source, other than the client computer, of a plurality of different content files, and at least one filter defined by a user of the peer computer, the filter describing a set of criteria used to narrow down the plurality of different content files to a list of content files; and
a subscription module, implemented by the one or more processors, to retrieve a content list corresponding to the list of content files.

9. The system of claim 8, wherein the distributed hash table module further performs:
retrieving subscriber connection information associated with a subscriber using the subscription identifier; and
requesting the subscription information from the subscriber using the subscriber connection information.

10. The system of claim 8, further comprising:
a connection storage module to store client connection information in the distributed hash table network using a subscription id hash of the subscription identifier as a key.

11. The system of claim 8, further comprising:
a download module to automatically download a second content file associated with the subscription.

12. The system of claim 11, wherein downloading is limited to a predefined transfer rate.

13. The system of claim 11, wherein downloading uses the BitTorrent protocol to receive the second content file from at least one peer machine.

14. The system of claim 8, wherein the subscription information includes a user-submitted ranking.

15. A non-transitory machine-readable medium comprising instructions which, when executed by a processor of a machine, cause the machine to perform operations comprising:
automatically generating, at a client computer, by one or more processors, a hash of the first content file located at the client computer;
using the hash at the client computer as a key into a distributed hash table to retrieve at least one subscription identifier, the subscription identifier uniquely identifying a subscription that has been linked to another copy of the first content file located at a peer computer;
wherein the subscription contains both a feed describing a source, other than the client computer, of a plurality of different content files, and at least one filter defined by a user of the peer computer, the filter describing a set of criteria used to narrow down the plurality of different content files to a list of content files;
retrieving a content list corresponding to the list of content files; and
displaying the content list at the client computer.

16. The non-transitory machine-readable medium of claim 15, wherein the operations further comprise:
retrieving subscriber connection information associated with a subscriber from the distributed hash table network using the subscription identifier; and
requesting the subscription information from the subscriber using the subscriber connection information.

17. The non-transitory machine-readable medium of claim 15, having further instruction data to cause a machine to:
store client connection information in the distributed hash table network using a subscription identification hash of the subscription identifier as a key.

18. The non-transitory machine-readable medium of claim 15, having further instruction data to cause a machine to:
automatically download a second content file associated with the subscription.

19. The non-transitory machine-readable medium of claim 18, wherein downloading is limited to a predefined transfer rate.

20. The non-transitory machine-readable medium of claim 18, wherein downloading uses the BitTorrent protocol to receive the second content file from at least one peer machine.

\* \* \* \* \*